United States Patent
Schwalb

(10) Patent No.: US 9,491,613 B2
(45) Date of Patent: **\*Nov. 8, 2016**

(54) METHOD AND APPARATUS FOR STEERING OF ROAMING

(71) Applicant: ITXC IP Holdings S.a.r.l., Luxembourg (LU)

(72) Inventor: Thomas Schwalb, Pierrefonds (CA)

(73) Assignee: ITXC IP Holdings S.a.r.l., Luxembourg (LU)

( * ) Notice: Subject to any disclaimer, the term of this patent is extended or adjusted under 35 U.S.C. 154(b) by 7 days.

This patent is subject to a terminal disclaimer.

(21) Appl. No.: 14/681,543

(22) Filed: Apr. 8, 2015

(65) Prior Publication Data

US 2015/0215769 A1    Jul. 30, 2015

Related U.S. Application Data

(63) Continuation of application No. 11/408,771, filed on Apr. 21, 2006, now Pat. No. 9,031,557.

(51) Int. Cl.
*H04W 8/12* (2009.01)
*H04W 8/04* (2009.01)
*H04W 48/04* (2009.01)
*H04W 92/02* (2009.01)

(52) U.S. Cl.
CPC ............ *H04W 8/12* (2013.01); *H04W 8/04* (2013.01); *H04W 48/04* (2013.01); *H04W 92/02* (2013.01)

(58) Field of Classification Search
CPC ..... H04W 8/04; H04W 48/04; H04W 92/02; H04W 8/12

USPC ...... 455/435.1, 410, 411, 433; 370/230, 328
See application file for complete search history.

(56) References Cited

U.S. PATENT DOCUMENTS

| | | | |
|---|---|---|---|
| 5,862,481 A * | 1/1999 | Kulkarni | H04W 88/16 455/432.2 |
| 5,933,784 A | 8/1999 | Gallagher et al. | |
| 7,003,306 B2 | 2/2006 | Henry-Labordere | |
| 7,072,651 B2 | 7/2006 | Jiang et al. | |
| 9,031,557 B2 * | 5/2015 | Schwalb | H04W 8/04 455/410 |
| 2003/0036394 A1 | 2/2003 | Henry-Labordere | |
| 2003/0078054 A1 | 4/2003 | Okuda | |
| 2003/0100326 A1 | 5/2003 | Grube et al. | |
| 2003/0129991 A1 | 7/2003 | Allison et al. | |
| 2004/0087305 A1 | 5/2004 | Jiang et al. | |

(Continued)

FOREIGN PATENT DOCUMENTS

EP    1463366 A2    9/2004

OTHER PUBLICATIONS

"Examination Report issued in counterpart EP patent application No. 07 825 362.2", Jul. 10, 2015, Publisher: EPO, Published in: EP.

(Continued)

*Primary Examiner* — Sam Bhattacharya
(74) *Attorney, Agent, or Firm* — Kaplan Breyer Schwarz & Ottesen, LLP

(57) ABSTRACT

A system and method for implementing steering of roaming (SOR) services in wireless networks is disclosed. The SOR platform operates on messages transmitted by a home location register (HLR), intercepting them and denying use of a visited network unless it is the preferred visited network of a home network.

21 Claims, 3 Drawing Sheets

(56) References Cited

U.S. PATENT DOCUMENTS

| | | |
|---|---|---|
| 2004/0196858 A1 | 10/2004 | Tsai et al. |
| 2005/0186939 A1 | 8/2005 | Barnea et al. |
| 2005/0215250 A1 | 9/2005 | Chava et al. |
| 2005/0232282 A1 | 10/2005 | Silver et al. |
| 2006/0025129 A1 | 2/2006 | Wolfman et al. |
| 2006/0068778 A1 | 3/2006 | Della-Torre |

OTHER PUBLICATIONS

"Counterpart EP Application No. 07 825 362.2", "Examination Report", Dec. 13, 2010, Publisher: EPO, Published in: EP.

"Counterpart EP Application No. 07 825 362.2", "Examination Report", Apr. 25, 2013, Publisher: EPO, Published in: EP.

"International Application No. PCT/IP2007/003058", "International Preliminary Report on Patentability", Oct. 22, 2008, Publisher: International Bureau of WIPO, Published in: CH.

"International Application No. PCT/IP2007/003058", "International Search Report and Written Opinion", May 8, 2008, Publisher: International Searching Authority / EPO, Published in: EP.

"Counterpart Canadian Patent Application No. 2650029", "Office Action", Aug. 8, 2012, Publisher: Canadian Intellectual Property Office, Published in: CA.

"Counterpart Canadian Patent Application No. 2650029", "Office Action", Oct. 22, 2013, Publisher: Canadian Intellectual Property Office, Published in: CA.

"Counterpart EP Application No. 07 825 362.2", "Examination Report", Feb. 19, 2009, Publisher: EPO, Published in: EP.

"Parent U.S. Appl. No. 11/408,771", "Final Office Action", Nov. 20, 2009, Publisher: USPTO, Published in: US.

"Parent U.S. Appl. No. 11/408,771", "Final Office Acfion", Jul. 19, 2012, Publisher: USPTO, Published in: US.

"Parent U.S. Appl. No. 11/408,771", "Non-Final Office Action", Feb. 18, 2011, Publisher: USPTO, Published in: US.

"Parent U.S. Appl. No. 11/408,771", "Non-Final Office Action", Apr. 29, 2009, Publisher: USPTO, Published in: US.

"Parent U.S. Appl. No. 11/408,771", "Notice of Allowance", Feb. 25, 2015, Publisher: USPTO, Published in: US.

\* cited by examiner

METHOD AND APPARATUS FOR STEERING OF ROAMING

CROSS-REFERENCE TO RELATED APPLICATION(S)

This application is a continuation of U.S. application Ser. No. 11/408,771, filed on Apr. 21, 2006 and entitled METHOD AND APPARATUS FOR STEERING OF ROAMING. The entirety of the foregoing application is hereby incorporated herein by reference.

TECHNICAL FIELD

This invention relates to wireless networks, and more particularly, to an improved method and apparatus for causing a roaming wireless device to be steered towards a particular visited carrier.

BACKGROUND OF THE INVENTION

Worldwide wireless voice and data access has recently become more prevalent. Wireless devices may be carried to many countries, almost anywhere in the world, and provide both voice and data access for a user. When a user roams outside of the area of his home network, he is said to be "roaming". Many prior art systems allow for such roaming by permitting the user to connect to a network in the area where he is roaming.

For explanation purposes, we define herein a visited network as the network, other than the home network to which a wireless device user is a subscriber, to which a user has access. We also refer herein to the home network as the wireless network of which the wireless device is a subscriber. Thus, for example, if a user is normally a registered subscriber in New Jersey, but travels to Toronto, Canada, a local wireless network operator in Toronto Canada to which the user has access, but to which the user is not a registered normal subscriber, would be deemed a visited network. The term visited network therefore, is with reference to a particular wireless device in that a network may be a visited network for one wireless device but may be the home network for another wireless device.

In order to provide the aforementioned roaming services, the various visited wireless networks must be capable of working with the home network. More particularly, if a user is a subscriber to home network in New Jersey, and travels to the United Kingdom, the visited network in the United Kingdom must have some way of coordinating with the home network back in the United States to insure proper authentication, billing, call routing, etc.

One manner in which this is typically accomplished is that the user's wireless device is detected by a visited network in the United Kingdom first. The United Kingdom visited network detecting the wireless device detects enough information to ascertain the identity of the home network associated with the wireless device. The visited network then contacts a home location register (HLR), maintained by the home network. For purposes of explanation, we assume herein that the HLR is a part of the home network, although it may be physically separate.

Usually, one of the first messages sent from the visited network to the home network has a well known standardized format, and is known in the art as a Location Update (LU) message. The HLR is a data base maintained by the home network that includes all of the necessary information and authentication data associated with a particular user. This information can then be transmitted back to the visited network, usually to a specific mobile switch within that visited network. In this manner, the home network can reject or authorize use of a visited network. One of the key messages transmitted from the HLR, to the visited network, in response to the LU, is called the Insert Subscriber Data message, or simply, the ISD. Generally however, there is a request from the visited network and a responsive message from the home network that either authorizes or refuses the request by the wireless device to use the visited network.

Additionally, the foregoing provides a manner in which the visited network can then bill the home network for the appropriate amount of air time and service. In this manner, a user of any network can use another network in some remote location, and this visited network will coordinate with the user's home network to facilitate billing, authentication, and other similar issues.

A slight complication to the above occurs when there are plural accessible visited networks at the user's location. Specifically, consider the situation of which a subscriber from New Jersey is roaming in Great Britain, and there are three networks that are accessible from the user's location. An issue arises as to which of the three networks should accept the user, interface with the user's home network back in New Jersey, and process the call or data access from the user's wireless device. Typically, contention among three such visited networks has been resolved by the handset picking the network with maximum signal strength, and/or applying a randomization factor when signal strengths are useable. Other factors may be utilized as well, such as a list of preferred networks which could be resident on the device's Subscriber Identity Module (SIM) card. This situation, however, means that the home network, with which the subscriber and wireless device are associated, has limited or no control over which visited network handles the call/data transmission.

A more sophisticated prior art system uses something called Steering of Roaming (SOR). An SOR system is depicted in relevant part in FIG. 1. SOR systems are intended to permit the home network to either determine or at least influence the particular choice of visited network to be used when plural such visited networks are available.

The prior art SOR platform 102 of FIG. 1 is operatively coupled to a home location register (HLR) 101, implemented on a computer with software and run by the home network. The various visitor location registers (VLR) are associated with the variety of the visited networks to which a traveling user may come within range.

In operation, when a user comes within range of a particular visited network, a VLR 106 associated with that visited network must first request authentication and other relevant information from the HLR 101. A message requesting same is sent from the particular VLR 106 through one of International Gateway Providers (IGP) 103-105 to HLR 101. One of these initial messages is most termed a location update (LU) message.

The SOR platform 102 determines if the requesting VLR 106 is associated with the particular visited network that the home network desires a roaming subscriber use. If not, the SOR platform 102 will intercept the request message and simply send back a rejection, leading the particular visited network to believe that the subscriber is either not authorized, or for some other reason is not permitted use of the visited network. In this manner, the wireless device will try other available visited networks, until a visited network is accepted by the SOR platform. Normally, within one or two tries, the visited network to which the home network desires to steer the call will be accessed, and the call will then be passed through the SOR 102 to the HLR for approval.

Several problems exist with the prior art approach of FIG. 1. First, the home network HLR 101 must maintain its own associated SOR platform 102. The SOR platform 102 is relatively expensive, and the home network operator would thus prefer, in certain circumstances, that the IGP providers 103-105 offer the service provided by the SOR platform 102. However, if an IGP includes a particular SOR platform, many messages will not be subjected to the SOR feature. This is because the various visited networks, and their associated VLR's 106, may utilize a different IGP to communicate with the HLR. Neither the home network, nor the HLR 101, has any real control over communications path utilized by a visited network to communicate the LU message.

Thus, for example, if IGP 103 includes an SOR feature 102, then VLR's that communicate with HLR 101 through the other IGPs 104 to 105 will not be subjected to the SOR feature. This is displayed in FIG. 2. As a result, it means that either all IGP's must have their own SOR platform, or the system will not work properly much of the time. This is because, in the arrangement shown in FIG. 2, the SOR functionality will only be applied to messages arriving via IGP 103, but not to messages arriving through the other IGPs. And, even if all IGPs have their own SOR, the coordination among all of them for the system to work properly would be cumbersome.

In view of the foregoing, there exists a need in the art for a more efficient manner in which to provide steering of roaming services.

There also exists a need in the art to provide steering of roaming services from an International Gateway Provider, so that the home network operator of the HLR does not have to invest in the costly hardware and software required for such services.

DETAILED DESCRIPTION OF THE PREFERRED EMBODIMENT

The above drawbacks and others of the prior art are overcome in accordance with the present invention which relates to a system and method for permitting one of plural IGP communications providers to provide steering of roaming (SOR) service, without requiring the home network or home location register (HLR) to maintain its own SOR platform. In accordance with an exemplary embodiment of the invention, the routing of messages from the HLR is slightly modified to send back its ISD or similar message through a particular one or more communications paths. These communications paths may then be configured to implement the SOR functionality in the reverse direction, intercepting the authorization or ISD, and precluding it from being sent if the visited network is not the preferred provider.

Figure 1:
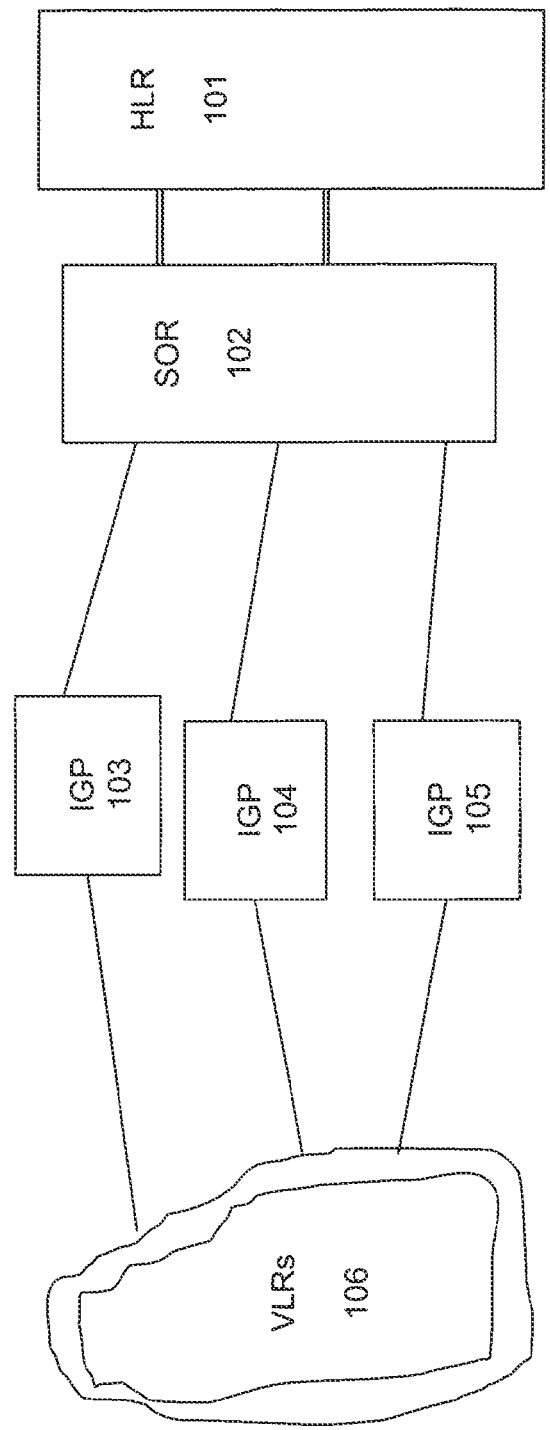
FIG. 1 is a prior other arrangement for implementing steering of roaming services.
Figure 2:
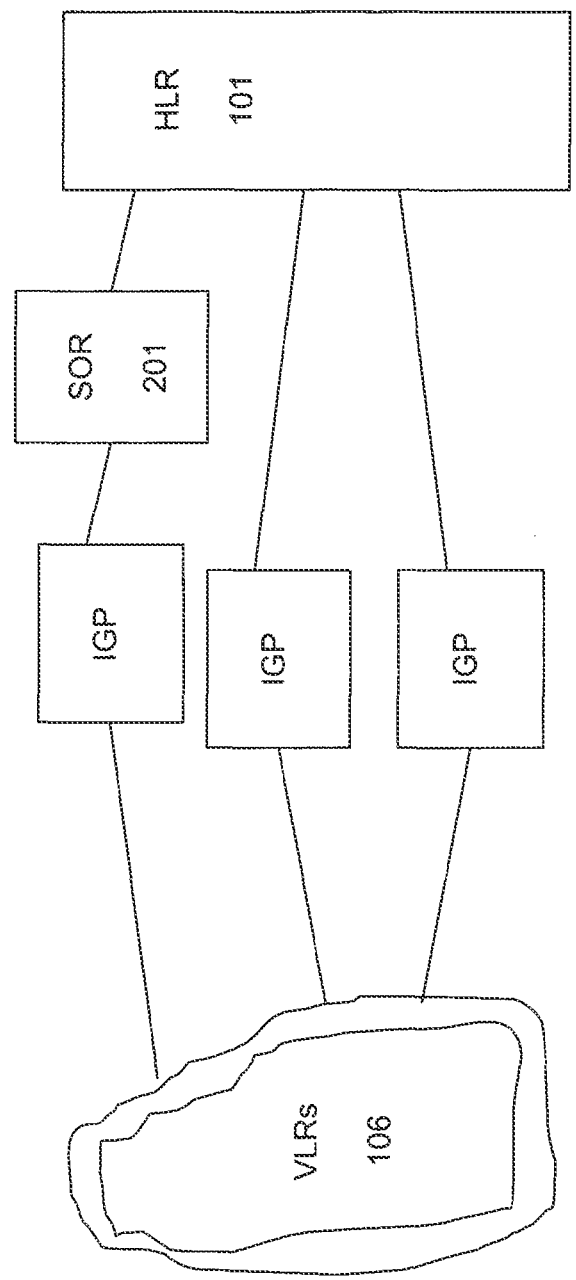
FIG. 2 shows an additional arrangement for implementing steering of roaming services.
Figure 3:
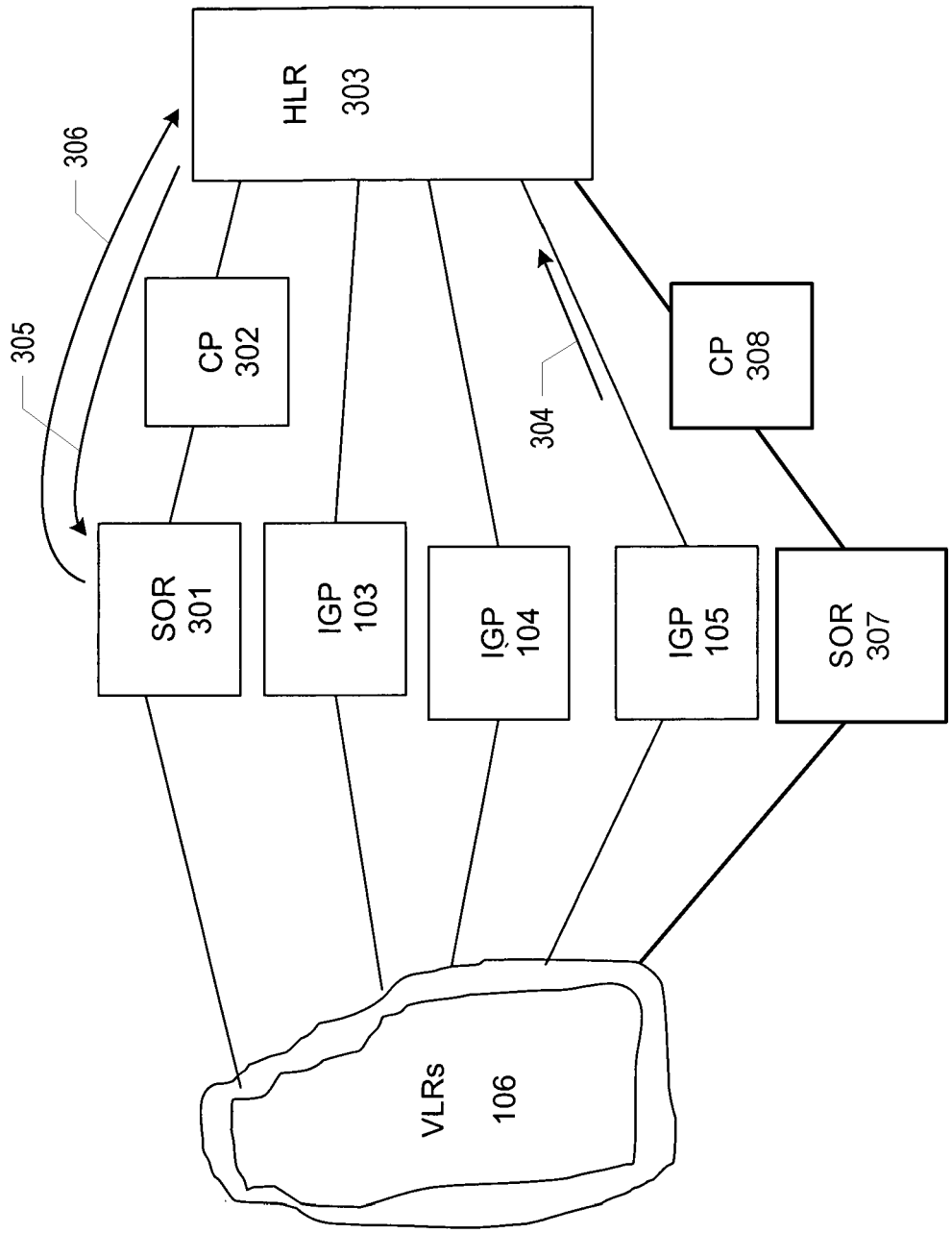
FIG. 3 is a conceptual diagram showing steering of roaming services implemented in accordance with the present invention.

For purposes of further explanation, we refer now to FIG. 3. The arrangement of FIG. 3 includes three IGPs 103-105, and an additional communications provider (CP) 302. The CP 302 may in actuality be one of the IGPs, but need not be. Additionally, SOR 301 is shown as being placed between the CP 302 equipment and the VLRs 106. This configuration is exemplary only, and it is also contemplated that the SOR 301 may be disposed elsewhere in the system.

In operation, when a roaming user comes within the range of a particular visited network, the VLR 106 associated with that particular visited network detects the user's wireless device, and its request to establish communications (e.g.; to make a call). This essentially establishes a connection between the wireless device and the visited network. The visited network then sends a Location Update (LU) message 304 to the HLR, likely through one of IGPs 103-105. Upon receipt of the LU message, the HLR 303 of FIG. 3, which has no SOR capabilities, will send back an Insert Subscriber Data (ISD) message 305. The ISD message serves, among other purposes to authenticate and authorize the user to use the visited network. It also serves to ensure the visited network operator that the home network will agree to pay the charges for use of the visited network, presumably then billing such charges back to the subscriber.

In accordance with the invention, the HLR's network is arranged to transmit all outgoing ISD's authorizing use of the visited network through a specified communications provider 302. Thus, regardless of which IGP or other channel is used by the VLR to communicate with the HLR, all ISDs and/or similar authorization messages are sent back to the visited network via a selected CP 302, which is known in advance to work in cooperation with the SOR platform 301. The HLR or its network can easily be reprogrammed to ensure all outgoing such messages are sent only through the desired CP 302.

Upon reception of the ISD in SOR platform 301 of FIG. 3, whatever rules and/or algorithm is desirable can be invoked to determine if the visited network should be accepted by the home network or not, for this subscriber and instance. While the specific rules and algorithm may be arranged in any desired fashion, typically they involve considerations of items such as preferred providers, volume discounts, number of attempts etc. These rules implemented by SOR 301 may be similar or identical to such rules as implemented in present day such systems.

If the SOR platform 301 determines that the user should be permitted to use the particular visited network in issue, then the SOR platform 301 passes the ISD messages to the VLR, essentially transparently. Of course there is a slight delay to perform the aforementioned processing.

If the SOR platform 301 determines that permission should be denied, then the SOR platform 301 sends a reject message to the particular VLR 106 that requested use of the visited network by the particular roaming subscriber. This LU-reject message informs the VLR and ultimately, the roaming wireless device, that the request has been rejected.

It is noted that in some cases, before the VLR will accept the reject message, some authentication information from the HLR is necessary. This information may be captured by the SOR from other messages, or may be programmed in advance.

In addition to the LU-reject message, an abort message 306 designated a TCAP abort may optionally be sent from the SOR to the HLR of the home network. This abort message serves to inform the HLR that the registration attempt has been aborted. In this case, thereafter, both the VLR and HLR are thus aware that the registration attempt has failed through the visited network associated with the VLR. The handset may then try a different visited network, eventually connecting to a visited network that the SOR platform 301 will authorize.

By using the foregoing technique, only one communications channel connected to the HLR needs to have the SOR capability. In prior art systems, if only one of the plural channels had the SOR capability, the system would not work properly because LU messages could arrive on the remaining communications channels (IGP's) used by the HLR, thereby circumventing the SOR function.

It is noted that if, after a predetermined number of tries, the wireless device has still not connected to the preferred visited network, the SOR may authorize the connection anyway so that the subscriber does not experience too many rejections and retries. Thus, it is advantageous for the SOR platform 301 to keep track of how many unsuccessful attempts to connect to visited networks have been made by the wireless device within a predetermined time period just prior to the SOR 301 processing a response message.

During the process of the VLR 106 contacting the HLR 303, and the remaining authentication/authorization process described above, the wireless device remains in a wait state. If the service request is denied, the device may simply try another network, but that subsequent attempt will preferably be after the HLR 303 has already been informed of the first attempt and failure, as described above. Therefore, the system will not present the HLR requests to connect to more than one visited network at the same time.

It is also noted that in cases where CP 302 ceases to function or has temporary outages, the HLR could transmit through another of the IGPs or other communications providers such as CP 308. Preferably, in the case of such outages, the HLR could utilize one or more other IGPs that have the SOR capability such as SOR 307. However, if there are no other IGPs available that have the SOR capability, the system would simply not implement the SOR functionality during times of an outage.

While the above describes the preferred embodiment of the invention, various other modifications and additions will be apparent to those of skill in the art. For example, the messaging described herein may be arranged to be compatible with standards such as MAP, TCAP, SS7, GSMA-IREG, or other known standards. Such modifications are intended to be covered by the claims appended hereto.

What is claimed is:

1. A method for processing a request from a visitor location register (VLR) for a wireless device to utilize a visited network served by the visitor location register, the method comprising:
    receiving, by a home location register (HLR) of the home network to which the wireless device belongs, along any one of a plurality of communications paths, a message from the visitor location register to request that the wireless device use the visited network; and
    transmitting, by the home location register, an authorization message responsive to the request message from the visitor location register, wherein the authorization message from the home location register is transmitted along a predetermined path of the plurality of communications paths, and wherein the predetermined path is selected based on the predetermined path routing into a steering of roaming (SOR) platform, the SOR platform being provided by an entity other than the operator of the HLR.

2. The method of claim 1 wherein the request message is a Location Update (LU) message.

3. The method of claim 1 wherein the authorization message is an Insert Subscriber Data (ISD) message.

4. The method of claim 1 wherein the predetermined path routes into a specified communications provider network that is different from the home network.

5. The method of claim 4 wherein the specified communications provider network is selected based on its interoperability with the steering of roaming platform.

6. The method of claim 4 wherein the home location register is arranged to transmit all authorization messages that authorize use of one or more visited networks, through the specified communications provider network.

7. The method of claim 4 further comprising transmitting, by the home location register, the authorization message to another communications provider network when the specified communications provider network ceases to function, the other communications provider network being in communication with another steering of roaming platform.

8. The method of claim 1 further comprising:
    determining, by the steering of roaming platform, whether or not to authorize use of the visited network by the home network; and
    if authorization is granted, forwarding the authorization message from the steering of roaming platform to the visited network.

9. The method of claim 1 wherein the home location register is absent of steering of roaming capability.

10. The method of claim 1 wherein the predetermined path is selected irrespective of on which of the plurality of communications paths the request message arrives.

11. A telecommunications system comprising:
    a home network to which a wireless device belongs, the home network comprising a home location register (HLR) connected to a plurality of communications paths and arranged to:
        i) receive, along any one of the plurality of communications paths, a message from a visitor location register (VLR) to request that the wireless device use a visited network served by the visitor location register, and
        ii) transmit an authorization message responsive to the request message from visitor location register, along a predetermined path of the plurality of communications paths that is selected based on the predetermined path routing into a steering of roaming (SOR) platform, the SOR platform being provided by an entity other than the operator of the HLR; and
    a first communications provider network that is different from the home network and configured to receive the authorization message via the predetermined path.

12. The system of claim 11 wherein the request message is a Location Update (LU) message.

13. The system of claim 11 wherein the authorization message is an Insert Subscriber Data (ISD) message.

14. The system of claim 11 wherein the first communications provider network operates in cooperation with the steering of roaming platform.

15. The system of claim 11 wherein the home location register is further arranged to transmit all authorization messages that authorize use of one or more visited networks, through the first communications provider network.

16. The system of claim 11 wherein the home location register is further arranged to transmit the authorization message to a second communications provider network when the first communications provider network ceases to function, the second communications provider network being in communication with another steering of roaming platform.

17. The system of claim 11 further comprising the steering of roaming platform, arranged to:
   determine whether or not to authorize use of the visited network by the home network; and
   when authorization is granted, forward the authorization message from the steering of roaming platform to the visited network.

18. The system of claim 11 wherein the home location register is absent of steering of roaming capability.

19. The system of claim 11 wherein the predetermined path is selected irrespective of on which of the plurality of communications paths the request message arrives.

20. The system of claim 11 wherein the HLR is further arranged to receive, subsequent to transmission of the authorization message, an abort message designated a TCAP abort from the SOR platform such that the abort message serves to inform the HLR that a registration attempt has been aborted.

21. A method for processing a request from a visitor location register (VLR) for a wireless device to utilize a visited network served by the visitor location register, the method comprising:
   receiving, by a home location register (HLR) of the home network to which the wireless device belongs, along any one of a plurality of communications paths, a message from the visitor location register to request that the wireless device use the visited network; and
   transmitting, by the home location register, an authorization message responsive to the request message from the visitor location register, wherein the authorization message from the home location register is transmitted along a predetermined path of the plurality of communications paths, and wherein the predetermined path is selected based on the predetermined path routing into a steering of roaming (SOR) platform; and
   receiving, by the home location register and subsequent to the transmitting of the authorization message, an abort message designated a TCAP abort from the SOR platform such that the abort message serves to inform the HLR that a registration attempt has been aborted.

* * * * *